United States Patent
Hung (10) Patent No.: US 11,165,159 B2
(45) Date of Patent: Nov. 2, 2021

(54) ANTENNAS IN FRAMES FOR DISPLAY PANELS

(71) Applicant: HEWLETT-PACKARD DEVELOPMENT COMPANY, L.P., Houston, TX (US)

(72) Inventor: Kuan-Jung Hung, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 659 days.

(21) Appl. No.: 16/080,227

(22) PCT Filed: Apr. 24, 2017

(86) PCT No.: PCT/US2017/029121
§ 371 (c)(1),
(2) Date: Aug. 27, 2018

(87) PCT Pub. No.: WO2018/199889
PCT Pub. Date: Nov. 1, 2018

(65) Prior Publication Data
US 2021/0194138 A1    Jun. 24, 2021

(51) Int. Cl.
*H01Q 9/42* (2006.01)
*H01Q 1/22* (2006.01)

(52) U.S. Cl.
CPC ............. *H01Q 9/42* (2013.01); *H01Q 1/2258* (2013.01)

(58) Field of Classification Search
CPC .............................. H01G 9/42; H01G 1/2258
See application file for complete search history.

(56) References Cited

U.S. PATENT DOCUMENTS

| | | |
|---|---|---|
| 6,697,022 B2 | 2/2004 | Ponce et al. |
| 7,339,530 B2 | 3/2008 | Ying et al. |
| 7,405,704 B1 | 7/2008 | Lin |
| 9,122,446 B2 | 9/2015 | Jervis et al. |
| 2004/0160370 A1 | 8/2004 | Ghosh et al. |
| 2005/0017914 A1 | 1/2005 | Huang |
| 2006/0001580 A1 | 1/2006 | Usui et al. |
| 2007/0035455 A1 | 2/2007 | Tseng |
| 2010/0176994 A1 | 7/2010 | Chang |
| 2012/0050134 A1* | 3/2012 | Wu ..................... H01Q 1/2258 343/908 |
| 2012/0162040 A1 | 6/2012 | Taura |
| 2014/0292613 A1 | 10/2014 | Hsiao et al. |

OTHER PUBLICATIONS

Chandra et al., "Cavity-Backed Slot Antennas for Wireless Portable Devices", Retrieved from Internet: https://ieeexplore.ieee.org/document/7481809/, 2016, 4 Pages.
Chen et al., "Small-Size Lte/wwan Two-strip Monopole Exciter Antenna Integration With Metal Covers", IEEE, Retrieved from Internet: https://ieeexplore.ieee.org/document/7476835/, 2016, 3 Pages.
Wood, "Multi-Function Antenna Fits in Laptop Hinge", Retrieved from Internet: http://newatlas.com/sat-antenna-laptop-hinge/44073/, 2016, 3 Pages.

* cited by examiner

*Primary Examiner* — Graham P Smith
(74) *Attorney, Agent, or Firm* — HPI Patent Department (57) ABSTRACT

The present subject matter describes an antenna positioned inside a frame for a display panel of an electronic device. In an example implementation, the antenna comprises a cuboidal antenna holder having a first excitation surface and a second excitation surface perpendicular to the first excitation surface.

14 Claims, 10 Drawing Sheets

ANTENNAS IN FRAMES FOR DISPLAY PANELS

BACKGROUND

Electronic devices, such as laptops and cellular phones, include antennas for wireless communication. Such antennas may be mounted in an enclosure or housing of the electronic device. The antennas enable communication of electronic devices with wireless networks and satellite navigation systems.

BRIEF DESCRIPTION OF DRAWINGS

The following detailed description references the drawings, wherein.

DETAILED DESCRIPTION

Electronic devices have an enclosure in which electronic components, such as a processor, a memory, a power source, a cooling fan, an I/O port, or the like, are housed. Electronic devices also include a display unit for rendering visual output. The enclosure may be coupled to the display unit through a coupling element, such as a hinge. In an example, the electronic device may be a laptop having a keyboard in the enclosure and a display panel in the display unit.

As the enclosure houses a wide variety of electronic components, the enclosure is space constrained. A wireless antenna is generally mounted within the enclosure along with the other electronic components. While positioning the antenna in the enclosure, certain pre-defined clearances are to be maintained between the antenna and other electronic components so that radiations from the antenna do not interfere with functioning of the other components. Positioning the antenna within the enclosure may also result in increase in specific absorption rate (SAR) associated with the radiations from the antenna at the bottom part of the enclosure. This may result in over heating of the bottom part of the enclosure of the electronic device.

The enclosure may have some portions made of metal. Antennas are generally mounted in a slot provided within the metal portion of the enclosure. The slot for the antenna, also called an antenna window, may be a cut-out in the metal portion. The antenna is placed in the slot and then the slot is covered with a plastic filling member. The radiations from the antenna are transmitted through walls of the plastic filling member. The plastic filling member is then coated with metal-finish paints in order to give the plastic filling member an appearance similar to the surrounding metal portion of the enclosure. Cutting a slot in the metal portion, positioning the antenna in the slot, covering the slot with the plastic filling member, and coating the plastic filling member with metal-finish paints involves additional material cost of the plastic filling member and the metal-finish paints and also involves additional production steps and production time.

The present subject matter relates to positioning antennas within a frame for a display panel of an electronic device. The frame and the display panel form part of the display unit of the electronic device. As the antenna is positioned in the frame for the display panel, challenges associated with placing the antenna in the space constrained enclosure are eliminated. Positioning the antenna in the frame also reduces the SAR on the bottom part of the enclosure and may reduce over heating of the enclosure of the electronic device. Further, with the antenna positioned in the frame, as the antenna is away from the other electronic components housed in the enclosure, chances of radiations from the antenna interfering with functioning of the other electronic components in the enclosure may be reduced. In addition, cutting of antenna windows in the enclosure may be avoided. This reduces the number of production steps, production time, and facilitates in eliminating use of additional plastic filling members and metallic paints on the plastic filling members, thereby reducing complexity and costs of assembling processes.

According to an example implementation of the present subject matter, a frame is described within which an antenna is positioned such that the antenna extends along a side of the frame which is couplable to a base unit of an electronic device. The base unit is an enclosure which houses electronic components, such as a processor, a memory, a power source, a cooling fan, an I/O port, of the electronic device and is coupled to the display unit. The antenna includes a cuboidal antenna holder having at least two excitation surfaces perpendicular to one another. The antenna is positioned along the side of the frame such that radiations from one of the two excitation surfaces are emitted out through a front surface of the side. The front surface of the side of the frame may be understood to be extending along a surface of the display panel on which visual content is generated. The other of the two excitation surfaces may face another side of the frame which is perpendicular to the side of the frame couplable to the base unit.

The antenna with multiple excitation surfaces and the alignment of these surfaces within the frame facilitate in obtaining a compact antenna which can be accommodated in the frame without compromise on bandwidth specifications of the antenna. The presence of multiple excitation surfaces also provide a greater electrical resonance, and thereby enables the antenna to transceive signals over a wider bandwidth of frequencies.

In an example implementation, the antenna includes at least a portion of a slot spanning within the first excitation surface and another slot spanning within the second excitation surface. One of the slots may be tuned to operate in 2.4 Giga Hertz frequency band and the other of the slots may be tuned to operate in 5 Giga Hertz frequency. Thus, the antenna positioned in the frame can be operated as a dual-band antenna which can reliably transceive signals over a wireless Local Area Network (WLAN).

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
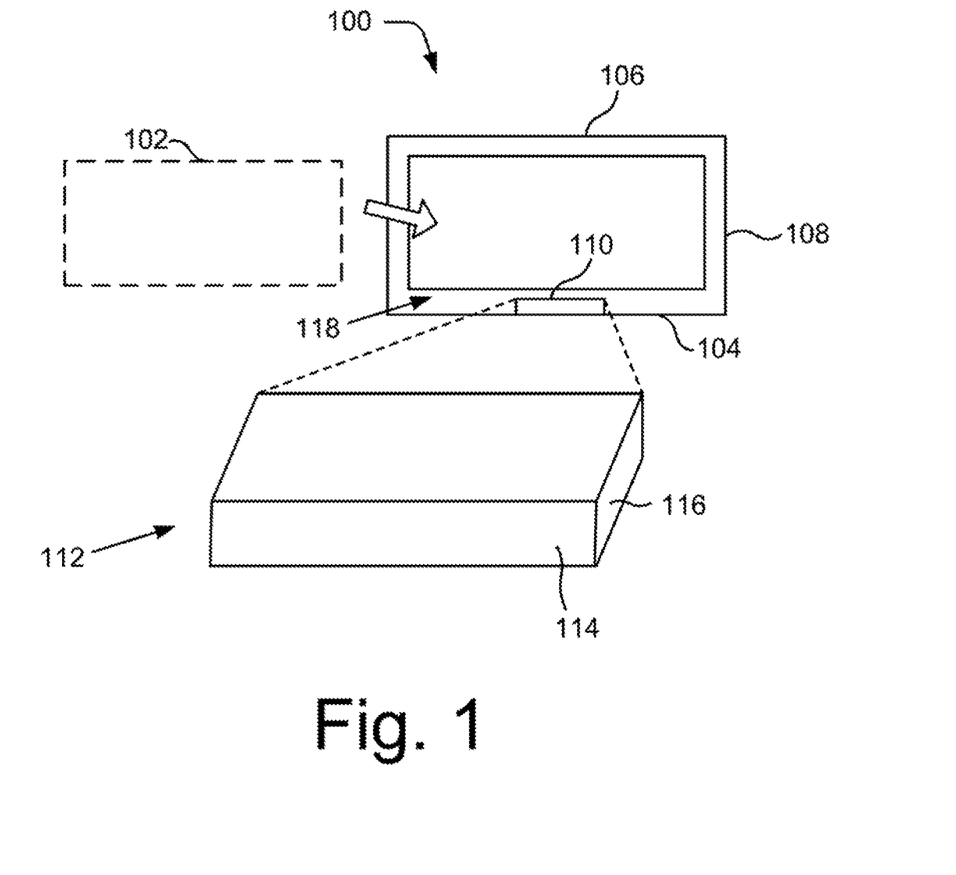
FIG. 1 illustrates a frame for a display panel of an electronic device, according to an example implementation of the present subject matter.

FIG. 1 illustrates a frame 100 for a display panel 102 of an electronic device, according to an example implementation of the present subject matter. The display panel 102 may be, for example, a liquid crystal display (LCD) panel or a light emitting diode (LED) panel for rendering visual output of the electronic device. In an example implementation, the display panel 102 may include a touchscreen for receiving touch-based inputs from a user.

In an example implementation, the frame 100 bordering the display panel 102 may be formed of a metal and may include a slot (not shown) for mounting the display panel 102 in the frame 100. The frame 100 may be covered by a plastic casing (not shown).

The frame 100, as shown in FIG. 1, has four sides. In an example implementation, the frame 100 is couplable to a base unit (not shown in FIG. 1) of an electronic device through a first side 104 of the frame 100. In an example implementation, coupling elements, such as hinges may be secured to the first side 104 for attaching the frame 100 to the base unit. The base unit may house a keyboard and other electronic components, such as a processor, a memory, a power source, etc. of the electronic device.

The frame 100 includes an antenna 110 positioned inside the frame 100 along the first side 104. The antenna 110 may be secured inside the frame 100 by use of adhesives or mechanical fasteners, such as screws (not shown). Although in FIG. 1, the antenna 110 is shown to be positioned along the first side 104, in an example implementation, the antenna 110 may also be positioned along a second side 106 opposite to the first side 104. Further, although FIG. 1 shows a single antenna positioned inside the frame 100, there may be two antennas or more than two antennas positioned inside the frame 100.

FIG. 1 illustrates the antenna 110 through a magnified view. As can be seen from the magnified view in FIG. 1, the antenna 110 includes a cuboidal antenna holder 112.

In an example implementation, radiating elements, such as slots or monopoles, of the antenna 110 may be formed on at least two surfaces of the antenna holder 112. The surfaces of the antenna holder on which the radiating elements are formed may be referred to as excitation surfaces. With reference to FIG. 1, radiating elements are formed on a surface 114 of the antenna holder 112 which faces the first side 104, such that radiations from the surface 114 are emitted out through a front surface 118 of the first side 104. The surface 114 is referred to as a first excitation surface.

The front surface 118 of the first side 104 may be understood to be extending along a front surface of the display panel 102 on which a visual output is generated. Radiating elements are also formed on a surface 116 of the antenna holder 112 which is perpendicular to the first excitation surface 114 and faces towards a third side 108 of the frame 100 perpendicular to the first side 104. The surface 116 is referred to as a second excitation surface.

Figure 2:
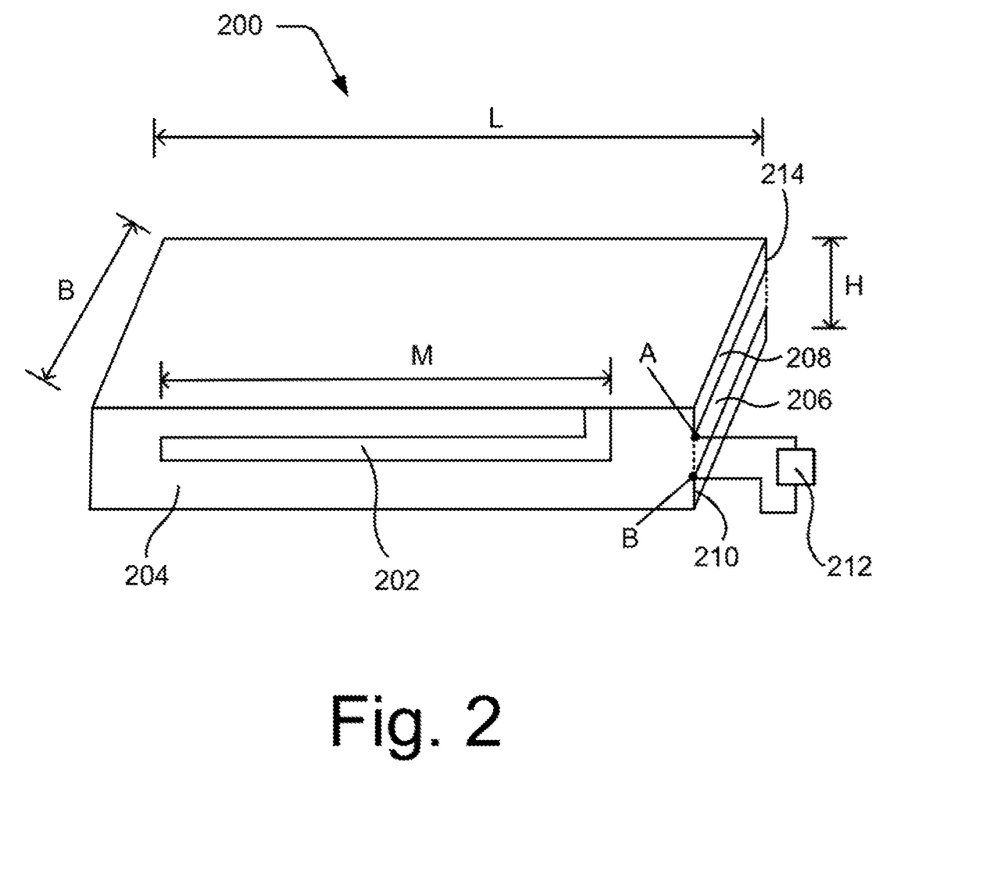
FIG. 2 illustrates a perspective view of an antenna holder, according to an example implementation of the present subject matter.

FIG. 2 illustrates a perspective view of an antenna holder 200, according to an example implementation of the present subject matter. In an example implementation, the antenna holder 112 of FIG. 1 may include the features and configuration of the antenna holder 200.

As shown in FIG. 2, the antenna holder 200 has a cuboidal structure. In an implementation, the antenna holder 200 has walls formed from a plastic material, such as Polycarbonate/ Acrylonitrile Butadiene Styrene (PC/ABS). The antenna holder 200 may be hollow or may contain a di-electric material within the plastic walls. In an example implementation, the di-electric material contained within the walls of the plastic antenna holder may have a di-electric constant higher than plastic. In an example implementation, a ceramic material may be contained within the walls of the plastic antenna holder, where ceramic has a di-electric constant higher than plastic. In an example implementation, the antenna holder 200 has a length 'L' in a range of about 20 mm to about 30 mm, a breadth 'B' in a range of about 8 mm to about 12 mm, and a height 'H' in a range of about 2.5 mm to about 3.5 mm.

In an example implementation, radiating elements, such as slots or monopoles may be formed on two surfaces of the antenna holder 200. Thus, the two surfaces of the antenna holder 200 bearing the radiating elements may be referred to as excitation surfaces. The remaining surfaces of the antenna holder 200 may be partly or fully coated with metal and may function either as excitation surfaces or ground surfaces, respectively.

With reference to FIG. 2, the antenna holder 200 includes a monopole radiator 202 spanning within a surface 204 of the antenna holder 200. The antenna holder 200 is positioned inside a frame, for example the frame 100, of a display panel of an electronic device, such that the surface 204 faces a side of the frame through which the frame is couplable to a base unit of the electronic device and radiations from the surface 204 are emitted out through a front surface of the side. The front surface of the side may be understood to be extending along a surface of the display panel on which visual content is generated.

In an example implementation, the monopole radiator 202 is formed from metal through electroplating on the surface 204 of a plastic antenna holder. The surface 204 is referred to as a first excitation surface. In an example implementation, the monopole radiator 202 may have a length M ranging between 20 mm to 25 mm. The monopole radiator 202 may be operated to transceive signals in 2.4 Giga Hertz frequency band. In an example implementation, the first excitation surface 114 illustrated in FIG. 1 may include the features and configuration of the first excitation surface 204.

The antenna holder 200 also includes a slot 206 spanning within a surface 208 perpendicular to the first excitation surface 204. The slot 206 may be tuned to transceive signals in 5 Giga Hertz frequency band. The surface 208 is referred to as a second excitation surface. In an example implementation, the second excitation surface 116 illustrated in FIG. 1 may include the features and configuration of the second excitation surface 208.

The slot 206 may be formed by selectively coating the antenna holder 200 with metal. In an example implementation, a metal layer may be selectively coated on predetermined portions on the surfaces of the antenna holder which is formed of a di-electric, such as plastic. Portions on which the metal layer is deposited act as a ground plate of the antenna and portions on which the metal layer is absent form the slots that act as radiating elements of the antenna. In another example implementation, during fabrication of the antenna, the antenna holder is coated with metallic strips having openings in them, where the openings are shaped like slots. The metallic strips can be coated on the antenna holder through electroplating using metal foils or other metal deposition techniques. Once the metallic strips with the openings are formed on the plastic antenna holder, the openings in the metallic strips form the slots. Although in the Figures, the slots are illustrated as being formed on a portion of a surface where metal coatings are absent, however, in an example implementation, the metal coatings may be completely absent on an entire surface of the antenna holder, such that the entire surface functions as a slot.

Further, as shown in FIG. 2, the antenna holder 200 has a feeding edge 210 formed at an interface of the first excitation surface 204 and the second excitation surface 208. The feeding edge 210 is a common edge between the first and second excitation surfaces, 204 and 208. The feeding edge 210 receives electrical feed signals from an input source 212. In an example implementation, the input source 212 may be a power source within an electronic device in which the antenna is mounted. One terminal of the input source 212 is connected to a point A of the feeding edge 210 and another terminal of the input source 212 is connected to a point B of the feeding edge 210. The points A and B may be referred to as feed points of the antenna. As shown in FIG. 2, the slot 206 spans within the second excitation surface 208 between the feeding edge 210 and an edge 214 of the antenna holder 200 opposite to the feeding edge 210. The length of the slot 206, is identical to the breadth B of the antenna holder 200.

Figure 3:
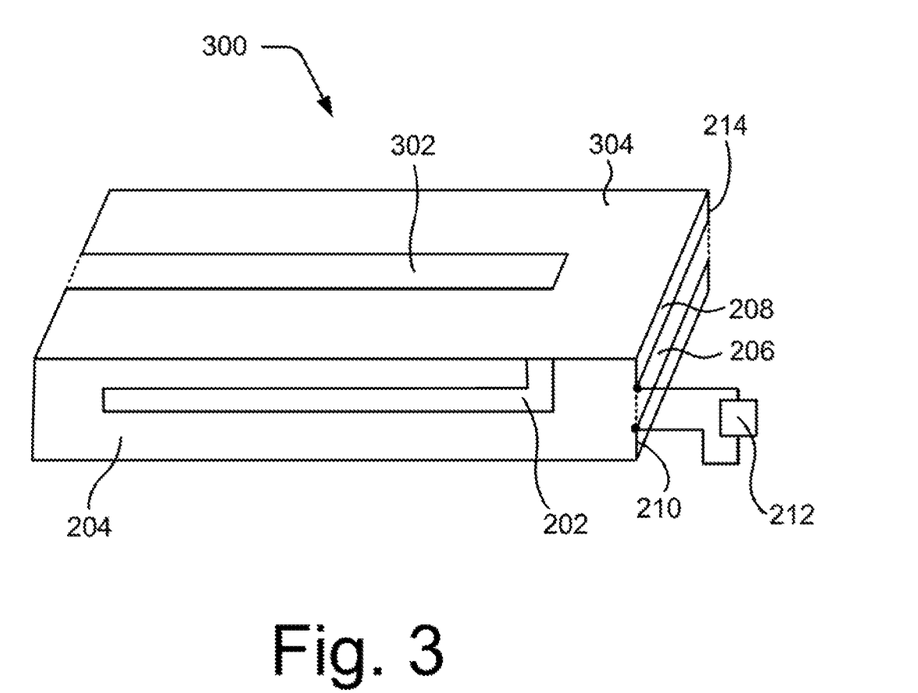
FIG. 3 illustrates a perspective view of another antenna holder, according to an example implementation of the present subject matter.

FIG. 3 illustrates a perspective view of an antenna holder 300, according to an example implementation of the present subject matter. In an example implementation, the antenna holder 112 of FIG. 1 may include the features and configuration of the antenna holder 300.

The antenna holder 300 illustrated through FIG. 3 is similar to the antenna holder 200 of FIG. 2 and includes the features of the antenna holder 200. With reference to FIG. 3, the slot 206 may be referred to as a first slot 206. The antenna holder 300 further includes a second slot 302 spanning within a surface 304 of the antenna holder 300 which is perpendicular to the first excitation surface 204 and the second excitation surface 208. The surface 304 bearing the second slot 302 may be referred to as a third excitation surface. The second slot 302 acts as a radiating element of the antenna and may be operated to transceive signals in 2.4 Giga Hertz frequency band. Also, the second slot 302 may be formed by similar techniques as that of forming the slot 206 of FIG. 2, as described earlier.

Figure 4:
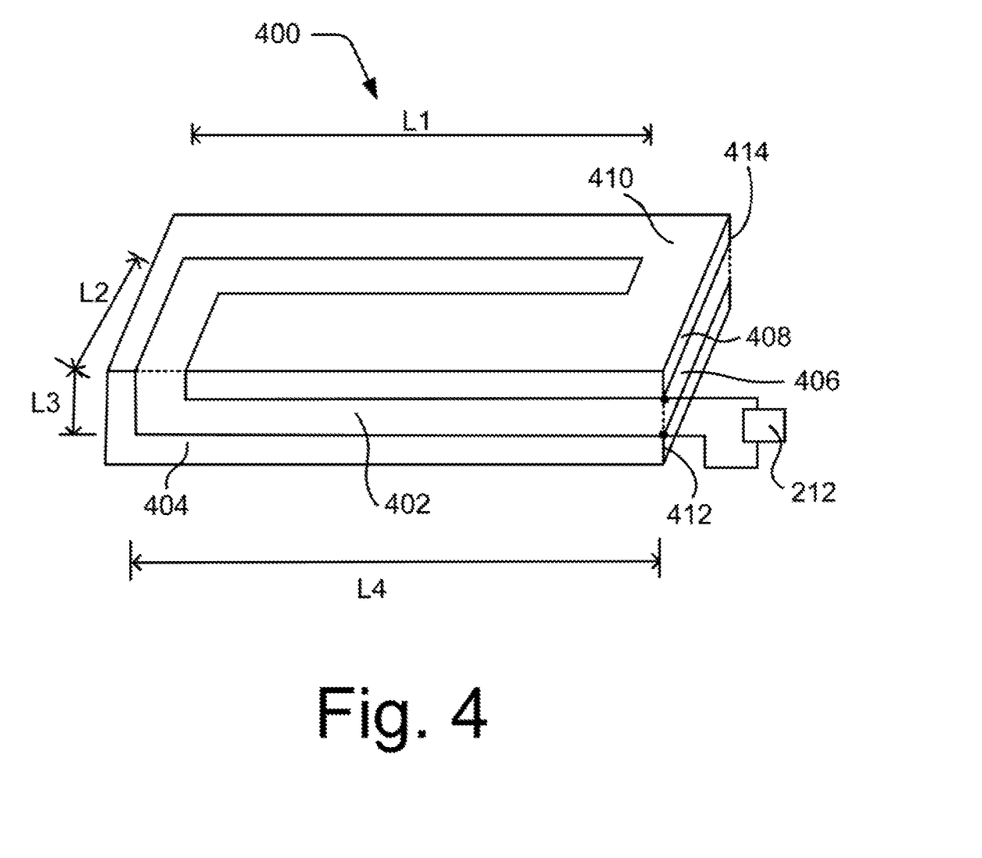
FIG. 4 illustrates a perspective view of another antenna holder, according to an example implementation of the present subject matter.

FIG. 4 illustrates a perspective view of an antenna holder 400, according to an example implementation of the present subject matter. In an example implementation, the antenna holder 112 of FIG. 1 may include the features and configuration of the antenna holder 400. The antenna holder 400 has a cuboidal structure and may be formed of similar materials as that of antenna holder 200. In an example implementation, the antenna holder 400 has a length, a breadth, and a height similar to that of the antenna holder 200 of FIG. 2.

In an example implementation, radiating elements, such as slots may be formed on three surfaces of the antenna holder 400. Thus, the three surfaces of the antenna holder 200 bearing the radiating elements may be referred to as excitation surfaces.

With reference to FIG. 4, the antenna holder 400 includes a first slot 402, a portion of which is formed on a surface 404 of the antenna holder 400. The antenna holder 400 is positioned inside a frame, for example the frame 100, of a display panel of an electronic device, such that the surface 404 faces a side of the frame through which the frame is couplable to a base unit of the electronic device and radiations from the surface 404 are emitted out through a front surface of the side. The front surface of the side may be understood to be extending along a surface of the display panel on which visual content is generated. The surface 404 of the antenna holder 400 is referred to a first excitation surface.

The antenna holder 400 also includes a second slot 406 spanning within a surface 408 of the antenna holder 400 which is perpendicular to the first excitation surface 404. The surface 408 is referred to a second excitation surface.

The first slot 402 spans within the first excitation 404 and another surface 410 of the antenna holder 400 which is perpendicular to the first excitation surface 404 and the second excitation surface 408. The surface 410 is referred to as a third excitation surface. The antenna holder 400 also includes a feeding edge 412, similar to the feeding edge 210 of antenna holder 200, formed at an interface of the first excitation surface 404 and the second excitation surface 408. As shown in FIG. 4, the first slot 402 has an end at the feeding edge 412 and another end on the third excitation surface 410. The second slot 406 spans within the feeding edge 412 and an edge 414 of the antenna holder 400 opposite to the feeding edge 412. The first and second slots, 402 and 406, may be formed by similar techniques as that of forming the slot 206 of antenna holder 200, as described earlier.

The first slot 402 acts as a radiating element of the antenna and may be operated to transceive signals in 2.4 Giga Hertz frequency band. In an example implementation, the first excitation surface 114 illustrated in FIG. 1 may include the features and configuration of the first excitation surface 404. The second slot 406 also acts as a radiating element of the antenna and may be operated to transceive signals in 5 Giga Hertz frequency band. In an example implementation, the second excitation surface 116 illustrated in FIG. 1 may include the features and configuration of the second excitation surface 408.

The length of the first slot 402, (L1+L2+L3+L4) as depicted in FIG. 4, ranges between 35 mm to 40 mm. The length of the second slot 406, is identical to the breadth B of the antenna holder 200.

In an example implementation, a surface of the antenna holder 400, opposite to the first excitation surface 404, may be fully coated with metal and may be referred to as a first ground surface (not shown in Figs.). Also, a surface of the antenna holder 400, opposite to the third excitation surface 410, may be fully coated with metal and may be referred to as a second ground surface (not shown in Figs.).

Figure 5:
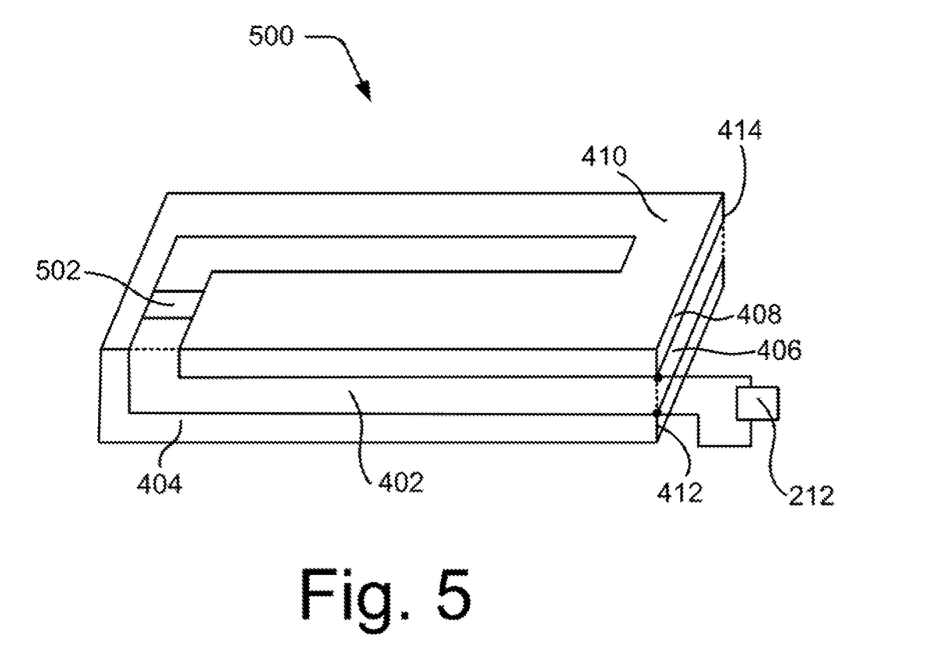
FIG. 5 illustrates a perspective view of another antenna holder, according to an example implementation of the present subject matter.

FIG. 5 illustrates a perspective view of an antenna holder 500, according to an example implementation of the present subject matter. In an example implementation, the antenna holder 112 of FIG. 1 may include the features and configuration of the antenna holder 500.

The antenna holder 500 illustrated through FIG. 5 is similar to the antenna holder 400 of FIG. 4 and includes the features of the antenna holder 400. With reference to FIG. 5, the antenna holder 500 includes a lump component 502 positioned on the first slot 402. In an example implementation, the lump component 502 may be an impedance matching component, such as an inductor or a capacitor used for tuning the antenna. In an example implementation, the lump component 502 may be formed by fabricating a printed circuit of an impedance matching component on the antenna holder 500. The lump component 502 allows tuning of operation frequency of the first slot 402 and increasing the number of electrical resonances and thereby increasing the bandwidth of the antenna.

Figure 6:
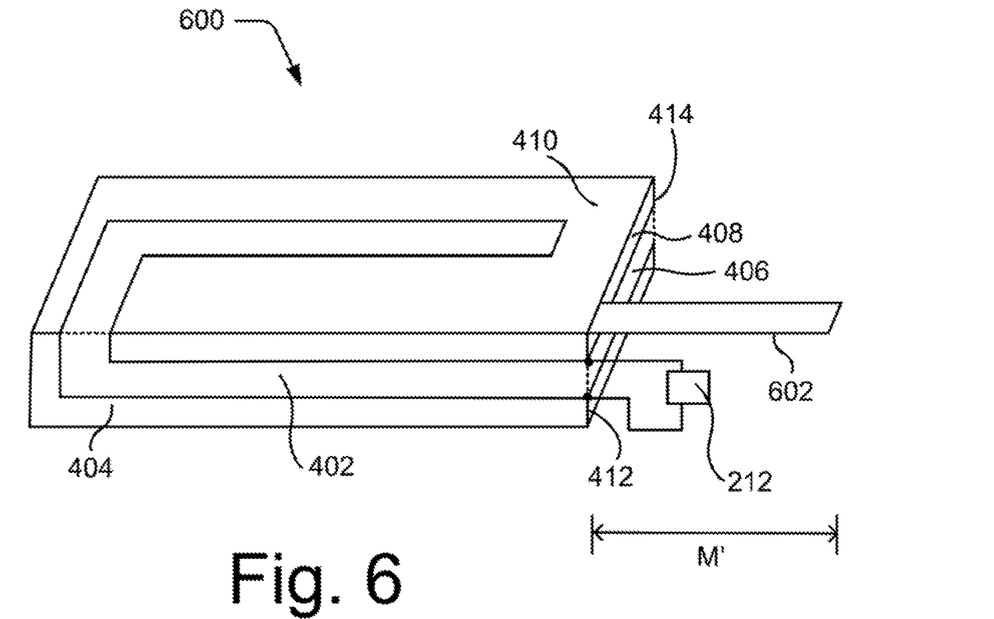
FIG. 6 illustrates a perspective view of another antenna holder, according to an example implementation of the present subject matter.

FIG. 6 illustrates a perspective view of an antenna holder 600, according to an example implementation of the present subject matter. In an example implementation, the antenna holder 112 of FIG. 1 may include the features and configuration of the antenna holder 600.

The antenna holder 600 illustrated through FIG. 6 is similar to the antenna holder 400 of FIG. 4 and includes the features of the antenna holder 400. With reference to FIG. 6, the antenna holder 600 includes a monopole radiator 602 extending in a direction away from the second excitation surface 408. The monopole radiator 602 is formed in a plane perpendicular to the first excitation surface 404 and has an end coupled to the feeding edge 412. In an example implementation, the monopole radiator 602 may be formed of a metal plate having an end coupled to the feeding edge 412. In an example implementation, the monopole radiator 602 may have a length N ranging from about 8 mm to about 10 mm. In the antenna holder 600, the first slot 402 may be tuned to operate in 2.4 Giga Hertz frequency band, and the second slot 406 and the monopole radiator 602 may be tuned to operate in the 5 Giga Hertz frequency band. Although FIG. 6 shows the monopole radiator 602 coupled to the antenna holder 400 of FIG. 4, in an example implementation, a monopole radiator, similar to the monopole radiator 602, may be coupled to the antenna holder 200 of FIG. 2. In the antenna holder 200, the monopole radiator may be coupled the feeding edge 210 and may extend in a direction away from the second excitation surface 208.

Figure 7A:
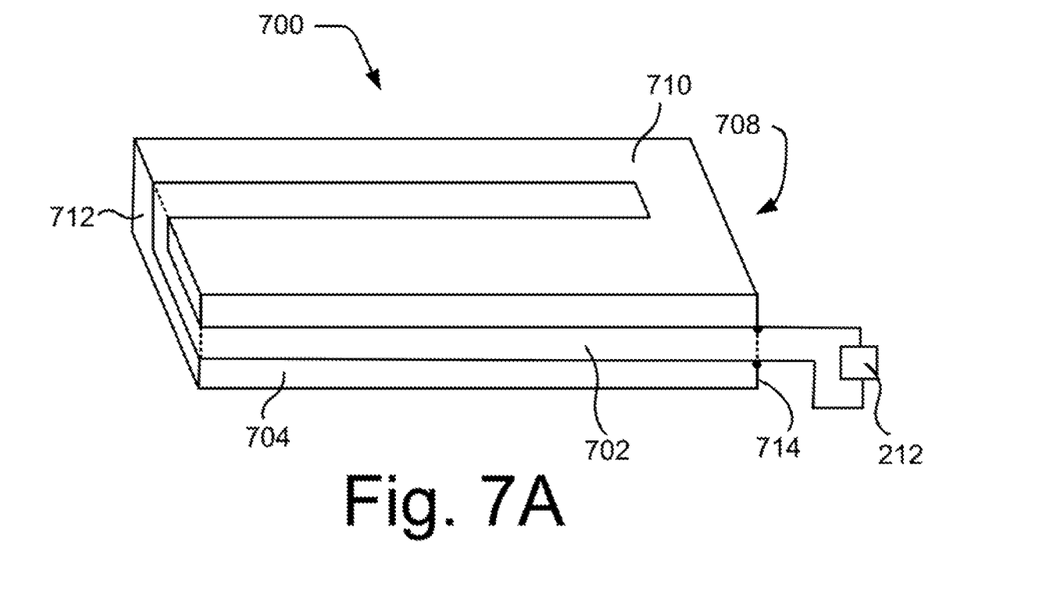
FIG. 7A illustrates a perspective view of another antenna holder, according to an example implementation of the present subject matter.
Figure 7B:
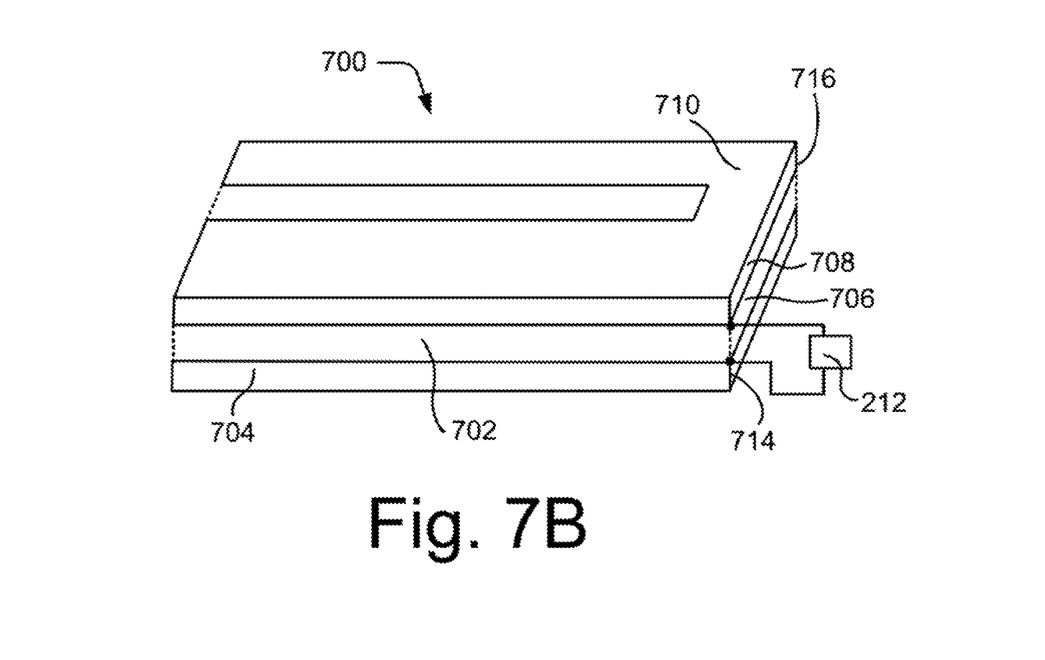
FIG. 7B illustrates another perspective view of the antenna holder of FIG. 7A, according to an example implementation of the present subject matter.

FIG. 7A illustrates a perspective view of an antenna holder 700, according to an example implementation of the present subject matter. FIG. 7B illustrates another perspective view of the antenna holder of FIG. 7A, according to an example implementation of the present subject matter. In an example implementation, the antenna holder 112 of FIG. 1 may include the features and configuration of the antenna holder 700.

The antenna holder 700 has a cuboidal structure and may be formed of similar materials as that of antenna holder 200. In an example implementation, the antenna holder 700 may have a length, a breadth, and a height similar to the length, the breadth, and the height of the antenna holder 200 of FIG. 2.

In an example implementation, radiating elements, such as slots may be formed on four surfaces of the antenna holder 700. Thus, the four surfaces of the antenna holder 300 bearing the radiating elements may be referred to as excitation surfaces. The remaining two surfaces (not depicted in FIGS. 7A and 7B) of the antenna holder 300 may be fully coated with metal and may function as ground surfaces, similar to the first ground surface and the second ground surface of the antenna holder 200.

With reference to FIGS. 7A and 7B, the antenna holder 700 includes a first slot 702, a portion of which is formed on a surface 704 of the antenna holder 700. The antenna holder 700 is positioned inside a frame, for example the frame 100 of a display panel of an electronic device, such that the surface 704 faces a side of the frame through which the frame is couplable to a base unit of the electronic device and radiations from the surface 704 are emitted out through a front surface of the side. The front surface of the side may be understood to be extending along a surface of the display panel on which visual content is generated. The surface 704 of the antenna holder 700 is referred to as a first excitation surface.

As depicted in FIG. 7B, the antenna holder 700 also includes a second slot 706 spanning within a surface 708 of the antenna holder 700 which is perpendicular to the first excitation surface 704. The surface 708 is referred to as a second excitation surface.

The first slot 702 spans within the first excitation surface 704, a surface 710 of the antenna holder 700 perpendicular to the first excitation surface 704 and the second excitation surface 708, and another surface 712 of the antenna holder 700 opposite to the second excitation surface 708. The surface 710 is referred to as a third excitation surface and the surface 712 is referred to as a fourth excitation surface.

The antenna holder 700 also includes a feeding edge 714, similar to the feeding edge 210 of antenna holder 200, formed at an interface of the first excitation surface 704 and the second excitation surface 708. As shown in FIG. 7A, the first slot 702 has an end at the feeding edge 714 and another end on the third excitation surface 710. As shown in FIG. 7B, the second slot 706 spans within the feeding edge 714 and an edge 716 of the antenna holder 700, opposite to the feeding edge 714. The first and second slots, 702 and 706, may be formed by similar techniques as that of forming the slot 206 of antenna holder 200, as described earlier.

The first slot 702 acts as a radiating element of the antenna and may be operated to transceive signals in 2.4 Giga Hertz frequency band. In an example implementation, the first excitation surface 114 illustrated in FIG. 1 may include the features and configuration of the first excitation surface 704. The second slot 706 acts as a radiating element of the antenna and may be operated to transceive signals in 5 Giga Hertz frequency band. In an example implementation, the second excitation surface 116 illustrated in FIG. 1 may include the features and configuration of the second excitation surface 708.

Although not shown in FIGS. 7A and 7B, in an example implementation, the antenna holder 700 may also include a monopole radiator, such as the monopole radiator 602 of FIG. 6, having an end coupled to the feeding edge 714 and extending in a direction away from the second excitation surface 708.

Figure 8:
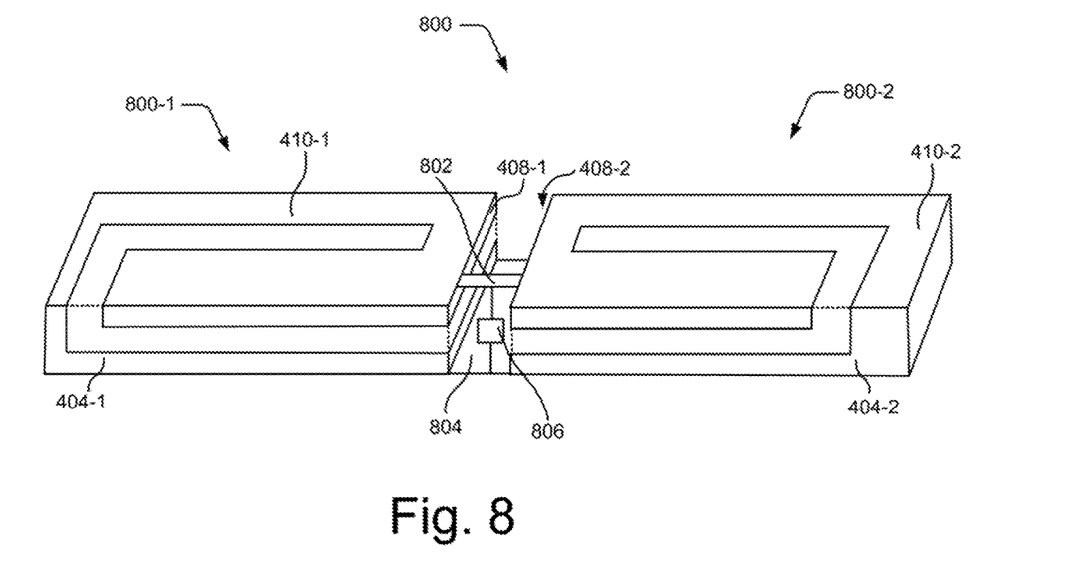
FIG. 8 illustrates a perspective view of another antenna holder, according to an example implementation of the present subject matter.

FIG. 8 illustrates a perspective view of an antenna holder 800, according to an example implementation of the present subject matter. In an example implementation, the antenna holder 800 may be implemented in the frame 100 of FIG. 1.

As shown in FIG. 8, the antenna holder 800 includes two antenna holders, a first antenna holder 800-1 and a second antenna holder 800-2, coupled to one another. In an example implementation, the antenna holder 800 is referred to as a cascaded antenna holder. Each of the two antenna holders, 800-1 and 800-2, are similar to the antenna holder 400 of FIG. 4 and includes the components and features of the antenna holder 400.

With reference to FIG. 8, the first antenna holder 800-1 has a first excitation surface 404-1, a second excitation surface 408-1, and a third excitation surface 410-1. Likewise, the second antenna holder 800-2 has a first excitation surface 404-2, a second excitation surface 408-2, and a third excitation surface 410-2. The first excitation surfaces, 404-1 and 404-2, are similar to and include the features of the first excitation surface 404 of FIG. 4, the second excitation surfaces, 408-1 and 406-2, are similar to and include the features of the second excitation surface 408 of FIG. 4, and the third excitation surfaces, 410-1 and 410-2, are similar to and include the features of the third excitation surface 410 of FIG. 4.

Further, the first antenna holder 800-1 also includes a first ground surface (not shown) opposite to its first excitation surface 404-1 and a second ground surface (not shown) opposite to its third excitation surface 410-1. The first and second ground surfaces of the first antenna holder 800-1 may be identical to the first and second ground surfaces of the antenna holder 400, as described earlier. Also, the second antenna holder 800-2 includes a first ground surface (not shown) opposite to its first excitation surface 404-2 and a second ground surface (not shown) opposite to its third excitation surface 410-2. The first and second ground surfaces of the second antenna holder 800-2 may be identical to the first and second ground surfaces of the antenna holder 400, as described earlier.

As shown in FIG. 8, the antenna holder 800 includes a first connecting plate 802 and a second connecting plate 804 between the first antenna holder 800-1 and the second antenna holder 800-2. In an example implementation, the first and second connecting plates, 802 and 804 may be one of metallic plates, metallic micro-strips, and metallic foils. The first connecting plate 802 extends between the third excitation surface 410-1 of the first antenna holder 800-1 and the third excitation surface 410-2 of the second antenna holder 800-2. The second connecting plate 804 extends between the second ground surface (not shown) of the first antenna holder 800-1 and the second ground surface (not shown) of the second antenna holder 800-2.

The antenna holder 800 is fed by a power source 806 connected in between the two antenna holders 800-1 and 800-2. As shown in FIG. 8, one terminal of the power source 806 is coupled to the first connecting plate 802 and other terminal of the power source is connected to the second connecting plate 804.

As two antenna holders are combined to form the antenna holder 800, the effective area of the antenna for transceiving signals is increased. Thus, the antenna having the antenna holder 800 has reduced power losses and a higher radiation efficiency. Also, owing to the presence of an antenna holder positioned on either side of the power source 806, the antenna holder 800 may be said to have a symmetrical structure. The symmetrical structure of the antenna holder 800 enables reduction of SAR.

Although, FIG. 8 illustrates the first and second antenna holders, 800-1 and 800-2, to be identical to the antenna holder 400 of FIG. 4, in an example implementation, the first and second antenna holders may be identical to the antenna holder 200 as illustrated in FIG. 2. In another example implementation, the first and second antenna holders may be identical to the antenna holder 700 as illustrated through FIGS. 7A and 7B.

Further, although in FIG. 8 two similar antenna holders are combined to form the cascaded antenna holder, in an example implementation, two dissimilar antenna holders may also be combined to obtain a cascaded antenna holder. For example, the antenna holder 200 of FIG. 2 may be coupled to the antenna holder 400 of FIG. 4 to form the cascaded antenna holder, or the antenna holder 200 of FIG. 2 may be coupled to the antenna holder 700 of FIGS. 7A and 7B to form the cascaded antenna holder, or the antenna holder 300 of FIG. 3 may be coupled to the antenna holder 500 of FIG. 5 to form the cascaded antenna holder. Further, there may be other combinations of two antenna holders, from the antenna holders 200 to 700 illustrated through FIGS. 2-7, which may be coupled to each other to form the cascaded antenna holder.

Figure 9:
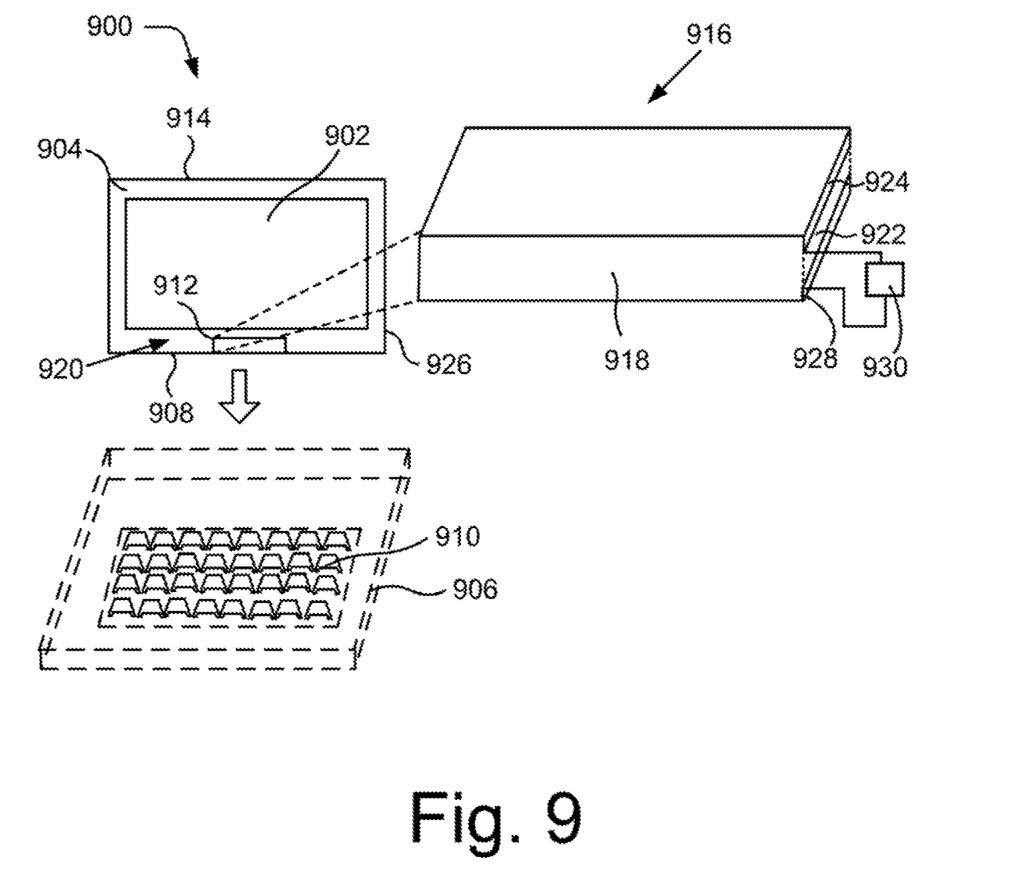
FIG. 9 illustrates a display unit of an electronic device, according to an example implementation of the present subject matter.

FIG. 9 illustrates a display unit 900 of an electronic device, according to an example implementation of the present subject matter. The display unit 900 includes a display panel 902. The display panel 902 may be similar to that as described for FIG. 1. The display unit 900 also includes a frame 904 bordering the display panel 902. The frame 904 may be similar to that as described for FIG. 1 and has four sides, as depicted in FIG. 9.

The frame 904 is couplable to a base unit 906 of the electronic device thorough a first side 908 of the frame 904. The base unit 906 houses a keyboard 910 and may enclose a processor, a memory, an I/O port, etc., of the electronic device. The display unit 900 includes an antenna 912 positioned inside the frame 904 and along the first side 908 of the frame 904. In an example implementation, the antenna 912 may also be positioned along a second side 914 of the frame 904 opposite to the first side 908. Further, although in FIG. 9 a single antenna is shown to be positioned inside the frame 904, in an example implementation, multiple antennas may be positioned along the sides 908 and 914 of the frame 904.

As depicted in FIG. 9, the antenna 912 includes a cuboidal antenna holder 916. In an example implementation, the antenna 912 has radiating elements, such as slots, formed on two surfaces of the antenna holder 916. Thus, these two surfaces bearing the radiating elements may be referred to as excitation surfaces.

With reference to FIG. 9, radiating elements are formed on a surface 918 of the antenna holder 916 which faces the first side 908, such that radiations from the surface 918 are emitted out through a front surface 920 of the first side 908. The surface 918 is referred to as a first excitation surface. The front surface 920 of the first side 908 may be understood to be extending along a front surface of the display panel 902 on which a visual output is generated.

The antenna holder 916 also includes a slot 922 spanning within a surface 924 which is perpendicular to the first excitation surface 918 and faces a third side 926 of the frame 904 perpendicular to the first side 908. The surface 926 is referred to as the second excitation surface. In an example implementation, the slot 922 is tuned to transceive signals in 5 Giga Hertz frequency band. In an example implementation, the second excitation surface 924 may have features similar to the second excitation surface 204 of FIG. 2.

The first excitation surface 918 and the second excitation surface 924 have a common edge 928. In an example implementation, the common edge 928 may be similar to the feeding edge 210 of FIG. 2. The common edge 928 is coupled to an input source 930 to receive antenna feed signals from the input source 930. Further, the slot 922 has an end at the common edge 928. In an example implementation, the antenna holder 916, positioned inside the display unit 900, may include the features of any of the antenna holders 200 to 800, as illustrated through FIGS. 2 to 8.

Figure 10:
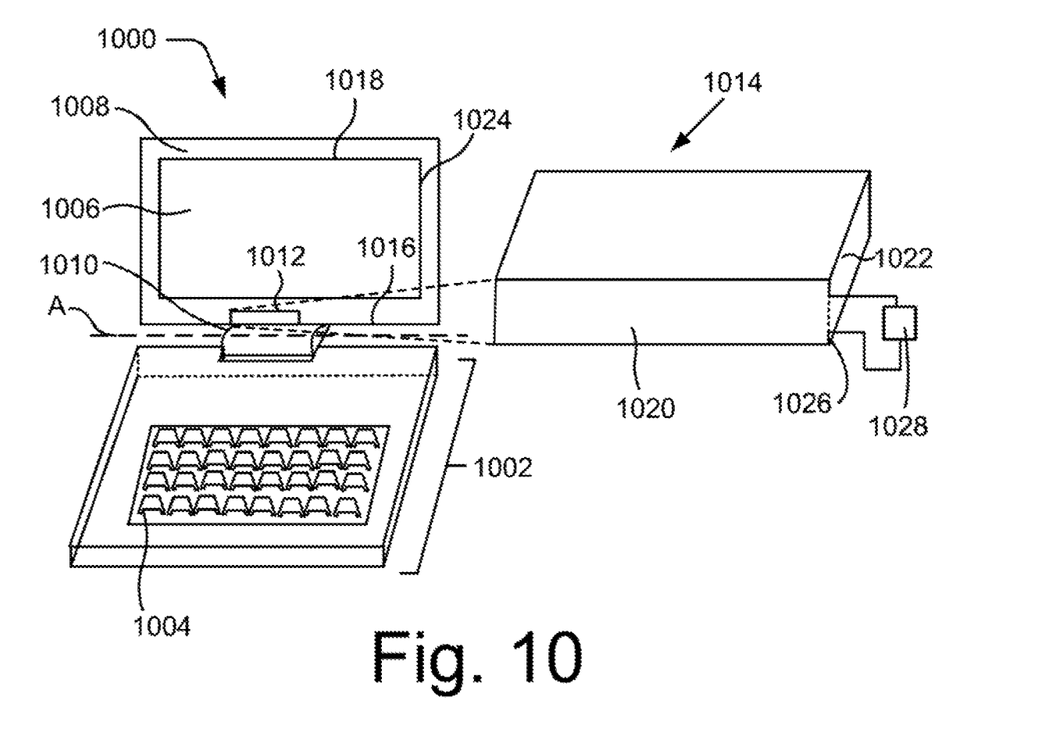
FIG. 10 illustrates an electronic device, according to an example implementation of the present subject matter.

FIG. 10 illustrates an electronic device 1000, according to an example implementation of the present subject matter. The electronic device 1000 includes a base unit 1002. The base unit 1002 houses a keyboard 1004. Other electronic components, such as, a processor, a memory, a power source, etc., can be mounted inside the base unit 1002. Examples of the electronic device 1000 include a laptop, a tablet, a notebook-tablet convertible, a smart phone, or the like.

The electronic device 1000 includes a display panel 1006, such as an LCD panel or an LED panel for rendering visual output. The electronic device 1000 also includes a frame 1008 encasing the display panel 1006. The frame 1008 may be similar to the frame 100 as illustrated in FIG. 1 or the frame 904 as illustrated in FIG. 9. The frame 1008 is coupled to the base unit 1002 through a coupling element 1010. In an example implementation, the coupling element 1010 may be a hinge. The coupling element 1010 facilitates movement of the display panel 1006 relative to the base unit 1002 about an axis of rotation A of the coupling element 1010.

As shown in FIG. 10, the electronic device 1000 includes an antenna 1012, positioned inside the frame 1008. The antenna 1012 includes a cuboidal antenna holder 1014 positioned along an edge 1016 of the frame 1008 which is substantially parallel to the axis of rotation A of the coupling element 1010. The antenna holder 1014 may be fastened to the frame 1008 along the edge 1016 by use of adhesives or mechanical fasteners, such as screws (not shown). Although in FIG. 10, the antenna holder 1014 is shown to be positioned along the edge 1016 of the frame 1008, in an example implementation, the antenna holder 1014 may be positioned along an edge 1018, opposite to the edge 1016, of the frame 1008.

In an example implementation, the antenna 1012 may have radiating elements, such as slots or monopoles, formed on two surfaces of the antenna holder 1014. Thus, these two surfaces bearing the radiating elements may be referred to as excitation surfaces.

With reference to FIG. 10, radiating elements may be formed on a surface 1020 of the antenna holder which faces the coupling element 1010. The surface 1020 is referred to as a first excitation surface.

Radiating elements may also be formed on a surface 1022 of the antenna holder 1014 which is perpendicular to the first excitation surface 1020 and faces towards an edge 1024 of the frame 1008 perpendicular to the axis of rotation A of the coupling element 1010. The surface 1022 is referred to as a second excitation surface.

The antenna holder 1014 also has a feeding edge 1026 formed at an interface of the first excitation surface 1020 and the second excitation surface 1022. In an example implementation, the feeding edge 1026 may be similar to the feeding edge 210 of FIG. 2 and may be coupled to an input source 1028 to receive antenna feed signals from the input source 1028. In an example implementation, the antenna holder 1014 may include the features of any of the antenna holders 200 to 800, as illustrated through FIGS. 2 to 8.

Although implementations of frames for display panels of electronic devices, display units, and electronic devices having such frames are described in language specific to methods and/or structural features, it is to be understood that the present subject matter is not limited to the specific methods or features described. Rather, the methods and specific features are disclosed and explained as example implementations of frames for display panels of electronic devices, display units, and electronic devices having such frames.

We claim:

1. A frame for a display panel of an electronic device, the frame comprising:
   an antenna positioned, inside the frame, along a side of the frame, wherein the side is one of a first side through which the frame is couplable to a base unit of the electronic device and a second side opposite to the first side, the antenna comprising:
   a cuboidal antenna holder having:
      a first excitation surface facing the side, such that radiations from the first excitation surface are emitted out through a front surface of the side;
      a second excitation surface perpendicular to the first excitation surface and facing towards a third side of the frame, wherein the third side is perpendicular to the first side; and
      a feeding edge formed at an interface of the first excitation surface and the second excitation surface, wherein the feeding edge is to receive signals from an input source.

2. The frame as claimed in claim 1, wherein the antenna holder has a third excitation surface perpendicular to the first excitation surface and the second excitation surface, the antenna holder further comprising:
   a first slot spanning within the first excitation surface and the third excitation surface, the first slot having an end at the feeding edge, wherein the first slot is to transceive signals in 2.4 Giga Hertz frequency band; and
   a second slot spanning within the second excitation surface between the feeding edge and an edge of the antenna holder opposite to the feeding edge, wherein the second slot is to transceive signals in 5 Giga Hertz frequency band.

3. The frame as claimed in claim 2, wherein the antenna holder comprises a shunt matching component positioned on the first slot.

4. The frame as claimed in claim 1, wherein the antenna comprises a monopole radiator extending in a direction away from the second excitation surface, wherein the monopole radiator is to transceive signals in 5 Giga Hertz frequency band.

5. The frame as claimed in claim 1, wherein the antenna holder has a third excitation surface perpendicular to the first excitation surface and the second excitation surface and a fourth excitation surface opposite to the second excitation surface, wherein the antenna holder further comprises:
   a first slot spanning within the first excitation surface, the third excitation surface, and the fourth excitation surface, the first slot having an end at the feeding edge, wherein the first slot is to transceive signals in 2.4 Giga Hertz frequency band; and
   a second slot spanning within the second excitation surface between the feeding edge and an edge of the antenna holder opposite to the feeding edge, wherein the second slot is to transceive signals in 5 Giga Hertz frequency band.

6. The frame as claimed in claim 1, wherein the antenna holder comprises:
   a monopole radiator spanning within the first excitation surface, wherein the monopole radiator is to transceive signals in 2.4 Giga Hertz frequency band; and
   a first slot spanning within the second excitation surface between the feeding edge and an edge of the antenna holder opposite to the feeding edge, wherein the first slot is to transceive signals in 5 Giga Hertz frequency band.

7. The frame as claimed in claim 6, wherein the antenna holder has a third excitation surface perpendicular to the first excitation surface and the second excitation surface, the antenna holder further comprising a second slot spanning within the third excitation surface, the second slot to transceive signals in 2.4 Giga Hertz frequency band.

8. The frame as claimed in claim 1, wherein the antenna holder comprises ceramic material at least in a portion inside the antenna holder.

9. A display unit of an electronic device, comprising:
a display panel;
a frame bordering the display panel;
an antenna positioned, inside the frame, along a side of the frame, wherein the side is one of a first side through which the frame is couplable to a base unit of the electronic device and a second side opposite to the first side, the antenna comprising:
a cuboidal antenna holder having:
a first excitation surface facing the side, such that radiations from the first excitation surface are emitted out through a front surface of the side;
a second excitation surface perpendicular to the first excitation surface and facing towards a third side of the frame, wherein the third side is perpendicular to the first side; and
a slot spanning within the second excitation surface, wherein the slot is to transceive signals in 5 Giga Hertz frequency band;
wherein the first excitation surface and the second excitation surface have a common edge to receive antenna feed signals from an input source, wherein the common edge forms an end of the slot.

10. The display unit as claimed in claim 9, wherein the antenna holder has a third excitation surface perpendicular to the first excitation surface and the second excitation surface, the antenna holder further comprising another slot spanning within the first excitation surface and the third excitation surface, the other slot having an end at the common edge, wherein the other slot is to transceive signals in 2.4 Giga Hertz frequency band.

11. The display unit as claimed in claim 9, wherein the antenna holder comprises a monopole radiator spanning within the first excitation surface, wherein the monopole radiator is to transceive signals in 2.4 Giga Hertz frequency band.

12. An electronic device comprising:
a base unit for housing a keyboard;
a display panel;
a frame encasing the display panel, wherein the frame is couplable to the base unit through a coupling element; and
an antenna comprising a cuboidal antenna holder positioned, inside the frame, along an edge of the frame, the edge being parallel to an axis of rotation of the coupling element, the cuboidal antenna holder having:
a first excitation surface along the edge, the first excitation surface facing the coupling element;
a second excitation surface perpendicular to the first excitation surface, the second excitation surface facing towards an edge of the frame perpendicular to the axis of rotation; and
a feeding edge formed at an interface of the first excitation surface and the second excitation surface, wherein the feeding edge is to receive signals from an input source.

13. The electronic device as claimed in claim 12, wherein the antenna holder has a third excitation surface perpendicular to the first excitation surface and the second excitation surface, the antenna holder further comprising:
a first slot spanning within the first excitation surface and the third excitation surface, the first slot having an end at the feeding edge, wherein the first slot is to transceive signals in 2.4 Giga Hertz frequency band; and
a second slot spanning within the second excitation surface between the feeding edge and an edge of the antenna holder opposite to the feeding edge, wherein the second slot is to transceive signals in 5 Giga Hertz frequency band.

14. The electronic device as claimed in claim 13, wherein the antenna holder comprises:
a monopole radiator spanning within the first excitation surface, wherein the monopole radiator is to transceive signals in 2.4 Giga Hertz frequency band; and
a slot spanning within the second excitation surface between the feeding edge and an edge of the antenna holder opposite to the feeding edge, wherein the slot is to transceive signals in 5 Giga Hertz frequency band.

* * * * *